Oct. 31, 1939.    T. L. SMITH    2,177,791

DRY SHAVING IMPLEMENT

Filed Oct. 4, 1937

INVENTOR
Theodore L. Smith
BY
F. W. Conway
ATTORNEY

Patented Oct. 31, 1939

2,177,791

UNITED STATES PATENT OFFICE 2,177,791

DRY SHAVING IMPLEMENT

Theodore L. Smith, Concord, Mass., assignor to Gillette Safety Razor Company, Boston, Mass., a corporation of Delaware Application October 4, 1937, Serial No. 167,160

3 Claims. (Cl. 30—43)

This invention relates to electric dry shaving implements of the type which employ stationary and movable cutter members having co-operating shearing teeth. In such implements it is very important that the reciprocating cutter should reverse its direction of stroke at the instant when its teeth register in exact alignment beneath the teeth of the stationary cutter. The exact alignment of the reciprocating and stationary cutter teeth relative to each other at this point of the cycle is of so much consequence that the failure to maintain it may render an otherwise excellent dry shaving implement practically useless. For example, it may result in cutting down the open time to such an extent that insufficient opportunity is afforded the hairs to reach the shearing zone in adequate numbers for a satisfactory shaving operation. The alignment of the cutter members is determined by the dimensions and assembled position of the parts of individual implements. It is impossible to hold all these dimensions to an exact measurement in any circumstances, and in mass production some tolerance variation must be permitted as a practical matter in respect to almost every dimension. These tolerance variations rarely if ever equalize each other in the assembled implement. The purpose of the present invention is to provide effective means to align the two sets of shearing teeth relatively to each other in the exact relationship required and at a time when the parts of the implement have been brought together in their final assembly.

The position of the reciprocating cutter member relative to the stationary or casing member depends upon many considerations, such, for example, as the location of the motor and the dimensions of the elements in the driving train between the motor shaft and the cutter, but the position of the stationary cutter may be directly determined with reference to the casing of the implement. In a desirable form my invention consists in a locating pin adjustably mounted in the casing of the implement and engaging with the stationary cutter member so that it may be adjustably shifted independently of the reciprocating cutter and locked in any selected position of adjustment. As herein shown the adjusting pin may be mounted in the casing beneath the stationary cutter member where it is readily accessible from within the casing after the parts of the implement have been assembled, but where it is ordinarily inaccessible after the implement reaches the hands of the user. Accordingly, it is not likely to be disturbed so as to cause misadjustment of the shearing members but maintains these elements in the location imparted to them by the manufacturer under conditions of precision.

These and other features of the invention will be best understood and appreciated from the following description of a preferred embodiment thereof, selected for purposes of illustration and shown in the accompanying drawing, in which.

Figure 1:
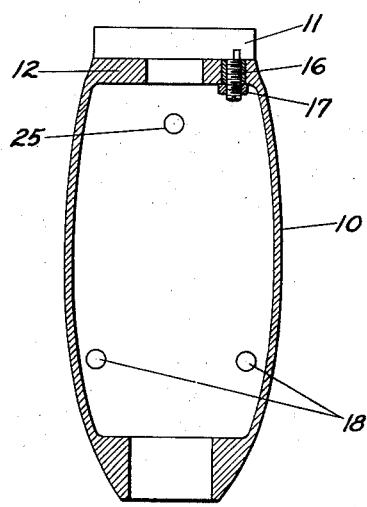
Fig. 1 is a view of the casing in longitudinal section.
Figure 4:
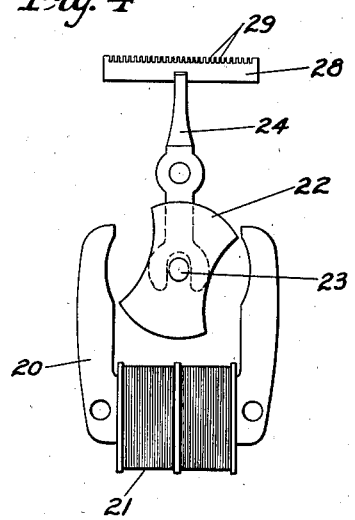
Fig. 4 is a view in elevation of the motor, the reciprocatory cutter member and its driving train, on the scale of Fig. 1.
Figure 2:
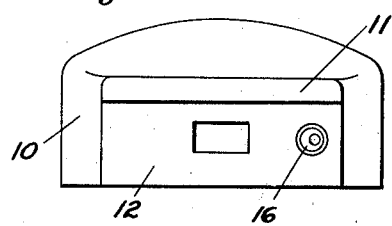
Fig. 2 is an end view on an enlarged scale of the principal casing member.
Figure 5:
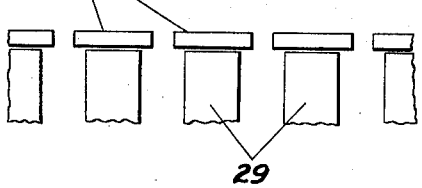
Fig. 5 is a diagrammatic view, on a greatly enlarged scale, of certain of the co-operating shearing teeth.

The dry shaving implement herein illustrated has a casing 10 of "Bakelite" or other plastic material which is moulded in shape to serve as a handle for the implement and also as a housing for a small motor. Part of the housing closure is formed by an upper horizontal wall 12 which supplies a seat for the metal head of the implement. A retaining flange 11 extends upwardly at one side of the wall 12 and a corresponding flange is formed in a cover piece not herein shown.

The exact construction of the head of the implement is not important insofar as it is affected by the present invention. The head herein shown is represented more or less conventonally as an elongated substantially rectangular outer member 13 having a series of transverse shearing teeth 14 formed in its upper surface. This outer stationary member 13 is provided with a longitudinal passage in which is mounted the reciprocatory cutter 28 having in its upper face a series of transverse shearing teeth 29 spaced similarly to the stationary shearing teeth 14 but of somewhat less width.

Within the casing 10 is mounted a motor comprising a U-shaped magnet 20 having field windings 21. The rotor 22 is mounted between the poles of the magnet 20 upon a shaft which carries an eccentric 23. An operating lever 24 is journaled upon a transverse shaft set in a hole 25 of the casing. It is forked at its lower end and embraces the eccentric 23 and is reduced at its upper end to engage a notch in the lower face of the reciprocatory cutter 28. The arm 23 extends upwardly through the aperture shown in the wall 12 of the casing. When the motor is energized the eccentric 23, through the oscillation of the arm 24, imparts a rapid vibration to the cutter 28 causing the movable shearing teeth to pass from the position of registration with the stationary shearing teeth 14, across the open shearing space and into shearing relation with the adjacent teeth of the series.

It will be noted that the position of the reciprocatory cutter 28 and of its path of movement depends upon a large number of dimensions where tolerance variations must be permitted for manufacturing purposes. For example, the position of the motor as a whole in the casing depends upon the location of two pins passing into two holes 18 of the casing. The position of the eccentric arm 24 depends upon the location of its fulcrum shaft in the hole 25 of the casing. Any variation of the location of the motor shifts the lower end of the eccentric arm 24, while any variation of the hole 25 tends to shift the position of the arm 24 with respect to the motor. Similarly any variation in the fit or location of the connection between the arm 24 and the cutter 28 introduces another possible variation in cutter location. There is no objection to necessary tolerance limits in the parts discussed but from what has been said, it will be seen that their effect is to determine variably the location of the reciprocatory cutter in each individual implement.

Figure 3:
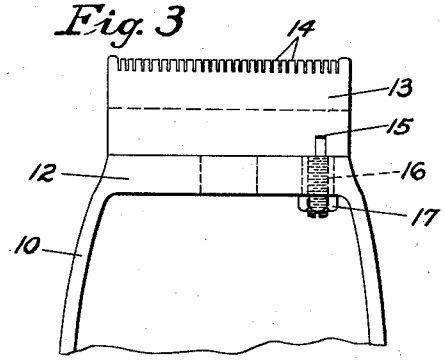
Fig. 3 is a fragmentary view in side elevation of the member shown in Fig. 2.

Having fixed the location and path of the cutter 28 once for all in the assembly of the implement the present invention makes available convenient and accurate means for adjusting and setting the longitudinal position of the outer shear member 13. As herein shown the member 13 is provided with a transverse slot or groove 15 in its lower face. One end of this slot is shown in Fig. 3 being exposed by the removal of the cover plate of the casing. A pin 16 having a reduced and eccentrically disposed end portion is threaded into the wall 12 of the casing, or into a bushing placed in the wall. The lower end of the pin 16 extends downwardly and into the interior of the casing where it is provided with a cross slot and a lock nut 17. The reduced end portion of the pin is carefully fitted to the transverse slot 15 of the stationary member 13 and serves accurately to determine the longitudinal position of this member. If it is necessary to adjust this member to bring the stationary teeth 14 into registration with the teeth 29 at the point of reversal the lock nut 17 may be loosened and the screw 16 turned in the appropriate direction, shifting the member 13 accurately and always under full control. Then when the proper adjustment has been made, the lock nut 17 is tightened and the member 13 is positively positioned longitudinally to give the most desirable condition of registration, open time and shearing stroke for the two co-operating sets of shearing teeth 14 and 29.

Having thus disclosed my invention and described a preferred embodiment thereof in order to illustrate it, but not in any limiting sense, what I claim as new and desire to secure by Letters Patent is:

1. A dry shaving implement comprising a casing having a wall forming part of a seat for an outer member provided with a series of transverse shearing teeth, a cutter having co-operating transverse teeth, operating mechanism for reciprocating the cutter in a predetermined path, and means extending into the casing through said wall, being inaccessible to the user from outside the implement and movable for accurately shifting said outer shearing member and for holding it rigidly in different positions of longitudinal adjustment upon its seat, whereby its teeth may be registered with those of the reciprocatory cutter at the point of reversal.

2. A dry shaving implement comprising a casing enclosing a motor and supporting a serrated shearing member, a cutter arranged to be reciprocated by the motor in a fixed path, an eccentric pin interlocking with said shearing member and rotatable for shifting said member and for locating it longitudinally upon the casing, whereby its teeth may be registered with those of the reciprocatory cutter at the point of reversal, and locking means for the pin enclosed within the casing.

3. A dry shaving implement comprising a casing, a head connected to the casing and including a cutter reciprocated in a path determined independently of the head, and an eccentric stop movable for adjustably determining the longitudinal position of the head and being accessible for adjusting movement only from within the casing.

THEODORE L. SMITH.